United States Patent
Walsh et al.

(10) Patent No.: US 7,323,670 B2
(45) Date of Patent: Jan. 29, 2008

(54) LASER OPERATION FOR SURVEY INSTRUMENTS

(75) Inventors: Gregory C. Walsh, Walnut Creek, CA (US); Ralph Storz, Colts Neck, NJ (US); Alan Aindow, Alameda, CA (US)

(73) Assignee: Leica Geosystems HDS LLC, San Ramon, CA (US)

( * ) Notice: Subject to any disclaimer, the term of this patent is extended or adjusted under 35 U.S.C. 154(b) by 22 days.

(21) Appl. No.: 11/081,354

(22) Filed: Mar. 16, 2005

(65) Prior Publication Data

US 2005/0205755 A1    Sep. 22, 2005

Related U.S. Application Data

(60) Provisional application No. 60/553,860, filed on Mar. 16, 2004.

(51) Int. Cl.
*G01J 1/32* (2006.01)
(52) U.S. Cl. .................. 250/205; 372/30; 356/5.01
(58) Field of Classification Search ........ 250/234–236, 250/205, 221; 356/3.01, 3.09, 5.01, 5.03–5.08; 372/25, 30, 38.02, 38.07
See application file for complete search history.

(56) References Cited

U.S. PATENT DOCUMENTS

| | | | | |
|---|---|---|---|---|
| 4,672,215 A | * | 6/1987 | Howard | 250/566 |
| 5,567,928 A | * | 10/1996 | Sano | 250/205 |
| 5,665,942 A | * | 9/1997 | Williams et al. | 178/19.01 |
| 5,680,313 A | * | 10/1997 | Whittaker et al. | 701/300 |
| 5,870,307 A | * | 2/1999 | Hull et al. | 700/182 |
| 5,988,862 A | | 11/1999 | Kacyra et al. | 703/6 |
| 6,420,698 B1 | | 7/2002 | Dimsdale | 250/234 |
| 6,593,582 B2 | | 7/2003 | Lee et al. | 250/458.1 |
| 6,604,068 B1 | | 8/2003 | Bukowski et al. | 703/22 |
| 6,633,290 B1 | | 10/2003 | Kung et al. | 345/423 |
| 6,804,380 B1 | | 10/2004 | Ioannou et al. | 382/103 |
| 6,870,631 B2 | * | 3/2005 | Johnston et al. | 356/602 |
| 7,202,941 B2 | * | 4/2007 | Munro | 356/5.01 |
| 2002/0136251 A1 | * | 9/2002 | Green et al. | 372/38.07 |

FOREIGN PATENT DOCUMENTS

DE    103 61 869 A1    12/2003

* cited by examiner

*Primary Examiner*—Georgia Epps
*Assistant Examiner*—Francis M LeGasse, Jr.
(74) *Attorney, Agent, or Firm*—Stallman & Pollock LLP

(57) ABSTRACT

The performance of a laser scanner is optimized in the field by automatically determining appropriate laser parameters for the scan location. A laser control system uses information such as the environmental temperature to select an appropriate range of start points for various laser parameters, such as pump temperature and laser currents. Test pulses over that range can be used to determine optimal operating parameters. In order to also meet safety regulations, the laser control system can use information such as range and pulse timing information to fire regularly spaced pulses that do not exceed acceptable exposure limits. Alternatively, the laser can be operated at a regular speed of about 24 Hz, or can be operated in burst mode where a burst of pulses creates what appears to be a brighter scan spot, but the time delay between bursts allows time for a blink reflex.

13 Claims, 4 Drawing Sheets

LASER OPERATION FOR SURVEY INSTRUMENTS

CLAIM OF PRIORITY

The application claims priority to U.S. Provisional Patent Application No. 60/553,860, entitled "LASER SCANNING SYSTEM," filed Mar. 16, 2004, which is hereby incorporated herein by reference.

TECHNICAL FIELD OF THE INVENTION

The present invention relates to the operation of lasers and laser scanning devices for surveying and other applications.

BACKGROUND

The acquisition of data and subsequent generation of computer models for real-world objects is of interest in many industries, for applications including architecture, physical plant design, entertainment applications (e.g., in movies and games), surveying, manufacturing quality control, medical imaging, and construction, as well as cartography and geography applications. In order to obtain accurate models of an object, as well as the area in which that object exists in the real world, it is necessary to take accurate measurements or samplings of surfaces that make up the object and any elements of the surrounding area. Historically, this sampling was carried out by surveyors, photogrammetrists, or technicians using techniques that provided samples at the rate of tens or hundreds per hour at most. Since the amount of data was relatively small, the data was easily dealt with in standard, off-the-shelf CAD programs or other modeling software.

Recent advances in technology such as LIDAR scanning technologies have resulted in the ability to collect billions of point samples on physical surfaces, over large areas, in a matter of hours. In a LIDAR process, a laser beam scans across a view that encompasses the structure of interest. The scanning device measures a large number of points that lie on surfaces visible in the scene. Each scan point has a measured location in 3D space, to within some measurement error, that typically is recorded relative to a point (x,y,z) in the local coordinate system of the scanner. The resulting collection of points is often referred to as one or more point clouds, where each point cloud can include points that lie on many different surfaces in the scanned view.

LIDAR systems are described, for example, in U.S. Pat. No. 5,988,862, filed Apr. 24, 1996, entitled "INTEGRATED SYSTEM FOR QUICKLY AND ACCURATELY IMAGING AND MODELING THREE DIMENSIONAL OBJECTS," which is hereby incorporated herein by reference. An exemplary LIDAR system 100 shown in FIG. 1 utilizes a Field Digital Vision (FDV) module 102 that includes a scanning sensor for scanning an object 104, such as a building of a piece of machinery. The scanning sensor also can sense the position in three-dimensional space of selected points on the surface of the object 104. The FDV module 102 generates a point cloud 106 that represents the sensed positions of the selected points. The point cloud 106 also can represent other attributes of the sensed positions, such as reflectivity, surface color, and texture, where desired.

A control and processing station 108 interacts with the FDV 102 to provide control and targeting functions for the scanning sensor. In addition, the processing and control station 108 can utilize software to analyze groups of points in the point cloud 106 to generate a model of the object of interest 104. A user interface 116 allows a user to interact with the system, such as to view a two-dimensional (2D) representation of the three-dimensional (3D) point cloud, or to select a portion of that object to be viewed in higher detail as discussed elsewhere herein. The processing station can include any appropriate components, such as standard computer and/or processing components. The processing station also can have computer code in resident memory, on a local hard drive, or in a removable drive or other memory device, which can be programmed to the processing station or obtained from a computer program product such as a CD-ROM or download signal. The computer code can include instructions for interacting with the FDV and/or a user, and can include instructions for undertaking and completing any modeling and/or scanning process discussed, described, or suggested herein.

The FDV 102 can include a scanning laser system (LIDAR) 110 capable of scanning points of the object 104, and that generates a LIDAR data signal that precisely represents the position in 3D space of each scanned point. The scanning laser system can include a beam steering unit (not shown) for directing laser pulses along a scan path, such as by following a raster pattern over an area of an object to be scanned. The beam steering unit also can direct the reflected portion of each pulse back to a detector or transceiver of the LIDAR system. The LIDAR data signal for the groups of scanned points can collectively constitute the point cloud 106. In addition, a video system 112 can be provided, which in one embodiment includes both wide angle and narrow angle CCD cameras. The wide angle CCD camera can acquire a video image of the object 104 and provides to the control and processing station 108, through a control/interface module 114, a signal that represents the acquired video image.

The acquired video image can be displayed to a user through a user interface 116 of the control and processing station 108. Through the user interface 116, the user can select a portion of the image containing an object to be scanned. In response to user input, the control and processing station can provide a scanning control signal to the LIDAR 110 for controlling the portion of the surface of the object that should be scanned by the LIDAR. More particularly, the scanning control signal can be used to control an accurate and repeatable beam steering mechanism that steers a laser beam of the LIDAR 110. The narrow angle CCD camera of the video system 112 can capture the intensity of the laser returned from each laser impingement point, along with any desired texture and color information, and can provide this captured information to the control and processing station 108. The control and processing station can include a data processing system (e.g., a notebook computer or a graphics workstation) having special purpose software that, when executed, instructs the data processing system to perform the FDV 102 control and targeting functions, and also to perform the model generation functions discussed elsewhere herein. Once the object has been scanned and the data transferred to the control and processing station, the data and/or instructions relating to the data can be displayed to the user.

FIG. 2 shows a block diagram of an optical transceiver 200 of the FDV. The optical transceiver 200 transmits an optical pulse to a spot on an object (or structure) being scanned, and receives back an optical pulse reflected from the object. Given the constant speed of light, the optical transceiver calibrates the distance to the spot on the target. A laser 202 fires the optical pulse, which typically lasts less than 250 psec, in response to an external command provided from a laser controller 204. The laser 202 produces the pulse, at a wavelength such as about 532 nm, within about 100-300 microseconds after receiving a command signal. The command signal emanates from a digital signal processor that provides central control of real time events. The time delay is a function of variables such as laser age, recent laser history, and environmental/operating conditions.

The output of the laser 202 is transmitted through a beam expander 206 that is focused to adjust the size of a light spot that will eventually impinge upon a point on the object being scanned. The focused optical pulse then is transmitted through a duplexer 208, which is an optical system for aligning the outgoing optical path with the incoming optical path. The duplexer 208 directs a significant first portion of the light energy of the outgoing optical pulse to a spot on the object via a scanner 210. A second but much smaller portion of the light energy of the outgoing optical pulse is directed to a receiver telescope 212. The portion of the outgoing optical pulse that propagates to the object impinges on a spot on the object, and some of the energy of the optical pulse is reflected off the object in a direction back to the duplexer 208. The returning optical pulse is directed by the duplexer 208 to the receiver telescope 212, which focuses the received energy onto a detector 214. The detector 214 converts the received optical pulse energy into electrical energy. The output of the detector is a series of electrical pulses, the first (generated by the detector in response to the small portion of the transmitted pulse not directed toward the object) occurring at a short fixed time (i.e., fixed by the length of the optical path through the beam expander, duplexer, and receiver telescope) and the second occurring as light energy returns from the object. Both the second, small portion of the transmitted pulse and the return optical pulse reflected from the spot on the object are provided to the timing circuit 216, which calculates the time of flight to the spot on the object. The range to the spot on the object can then be readily calculated from the calculated time of flight.

FIG. 3 is a block diagram showing an exemplary laser device 300 of the FDV. The heart of the laser system 300 is a conventional laser chip 302 that includes two bonded crystals coated with antireflective dielectric coatings. The laser chip 302 is pumped with a solid state diode 304 operating at 808.5 nm ±0.3 nm. The output frequency of the diode pump 304 is adjusted by changing the pump temperature with a thermoelectric cooler 306. The temperature of the diode pump 304 is measured with a thermistor 308, and the measured temperature is fed back into the diode power supply 310. The required temperature varies with each individual diode, but typically ranges from 20° to 30° C.

The output power of the diode pump 304 is typically 1 Watt, launched into a 100 micron core glass fiber. When continuously pumped, the output of the crystal laser 302 is approximately 35 mW average power at 1.064 microns, which corresponds to 2.4 microJoule pulses lasting about 280 psec at a repetition rate of 15 kHz. The multimode fiber is terminated by an SMA905 solid brass connector, with the crystal of the laser chip 302 glued to one end of the connector with an optical resin. This ensures adequate thermal dissipation from the crystal of the laser chip 302, keeping the crystal within the temperature range required for most efficient operation.

A piece of KTP frequency doubling crystal 312 is held within a few millimeters of the face of the laser chip crystal 302. This provides an ultimate output from the laser 300 having a 12 mW average power at 532 nm, which corresponds to 0.8 microJoule pulses lasting approximately one-third of a nanosecond. This ultimate output from the laser 300 is nearly diffraction limited (i.e., one which has theoretically minimum divergence, given a specific wavelength and waist diameter), with an apparent waist diameter of 56 microns. The laser can meet FDA Class II eye safe system design specifications, where the maximum energy per pulse that can be transmitted at 532 nm is 0.2 microJoules. With this restriction, the average power transmitted is largely dependent upon the pulse repetition rate.

The performance of a LIDAR system can vary over time, as well as under differing environmental and/or operating conditions. The performance variations can include changes in the intensity of each laser pulse emitted from the LIDAR system, as well as the duration and relative timing of each of the pulses. These changes can increase the margin for error in each point sample collected. For high precision measurements, these the increased error margins can result in unacceptably imprecise results.

Further complicating matters from a technical standpoint is the fact that any surveying instrument utilizing a laser beam must meet stringent safety regulations. The current state of the art involves reducing the output power of the system in order to ensure the laser beam meets a particular laser classification. Previous scanning systems met class II US regulations by limiting the power of individual pulses, ensuring a minimum pulse width, and limiting the number of laser pulses per second, regardless of the range or other operating parameters of the scan. In this way the laser beam was ensured to be Class II at all times. These limitations can cause problems with laser measurements, however, as the intensity of the laser is reduced. A reduction in intensity can increase the margin for error in large-scale applications. It also can increase the difficulty in locating the laser spot using a camera of the scanner device. These restrictions also function to limit the use of the device in terms of scanning speed and single point measurements.

DETAILED DESCRIPTION

Systems and methods in accordance with embodiments of the present invention can overcome deficiencies in existing scanning laser survey instruments by changing the way in which a laser is operated. In one embodiment, laser operating parameters can be selected automatically in order to obtain optimal laser operation. These selections can be done in the field, providing for optimization under a variety of operating conditions. Optimizations can be done before any scan, as well as during scans. In another embodiment, the operation of a laser scanner can be adjusted to ensure compliance with safety regulations while maintaining an acceptable visible intensity of spots produced by the laser system.

In a first embodiment, an in-device optimization system can allow for the automatic selection of laser operating parameters at the time and location where a scan is to be taken. This optimization system can include algorithms and instructions in either firmware or hardware, and can include any processing devices necessary to receive and interpret data to produce the appropriate parameter values. The system also can include sensors, detectors, or meters to monitor and/or determine values of various operating and/or environmental conditions. These can include standard components known and used in the art, such as temperature sensors, thermistors, intensity detectors, light meters, volt meters, current meters, pressure sensors, and other such components.

One of the most important parameters for LIDAR scanning is the average amount of time necessary to fire a pulse once a command signal is issued. The LIDAR system can track the amount of time that passes between a control signal including a command to fire a laser pulse and the actual emission of that pulse. These times can vary depending upon system and application, such as timing delays on the order of about 20-200 microseconds. A number of parameters can affect the average timing delay, the most critical of which for an exemplary system are the pump temperature, the idle current, and the pulse current. In order to optimize the average timing delay, it can be desirable to adjust at least one of these critical parameters. The parameter values typically are a function of the age and condition of the laser system, as well as environmental factors such as external temperature.

Figure 4:
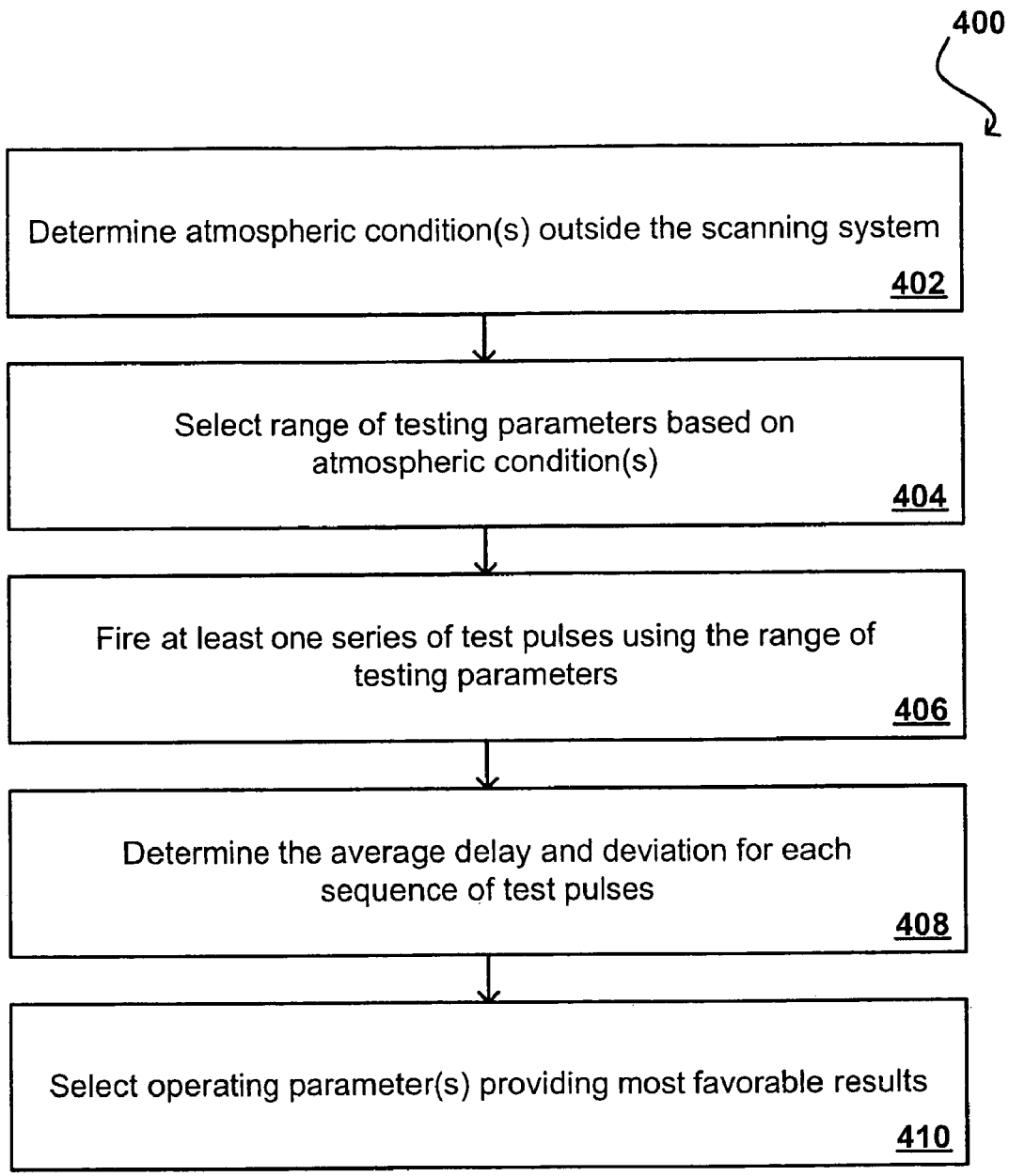
FIG. 4 is a flowchart showing steps of a process that can be used with the system of FIG. 1 in accordance with one embodiment of the present invention.

One method 400 for adjusting these parameters is shown in FIG. 4. This approach uses a test sequence, which can be initiated manually or configured to run automatically at startup or before scanning. In this approach, at least one measurement is made to determine an atmospheric condition, such as temperature, pressure, or light level, outside the scanning system 402. The resulting measurement can be used to select a range of parameter values for at least one operating condition (such as idle current, pulse current, and pump temperature) 404. Values over this range can be automatically programmed into the system for use during a test firing sequence. A number of test pulse sequences can be fired, each with different parameter values over the range 406. The system can measure the actual delay between the issuing of the command to fire each pulse and the actual emission of the respective pulse, and can calculate the average delay and deviation for each sequence of test pulses 408. Once the test information is obtained, the test parameters that produced the most favorable results can be selected as the operating parameters 410. In another approach, the information can be plugged into a standard search algorithm in the laser control system, either in firmware or software, in an attempt to determine the appropriate laser operating parameters for the current conditions. Parameters can be selected that will produce an acceptable timing delay with an acceptable standard deviation. The algorithm can use the search space defined by the various operating parameter ranges. The parameters can be supplied to a laser current and/or temperature controller as known in the art, for example, to adjust the operation of the laser system.

Figure 1:
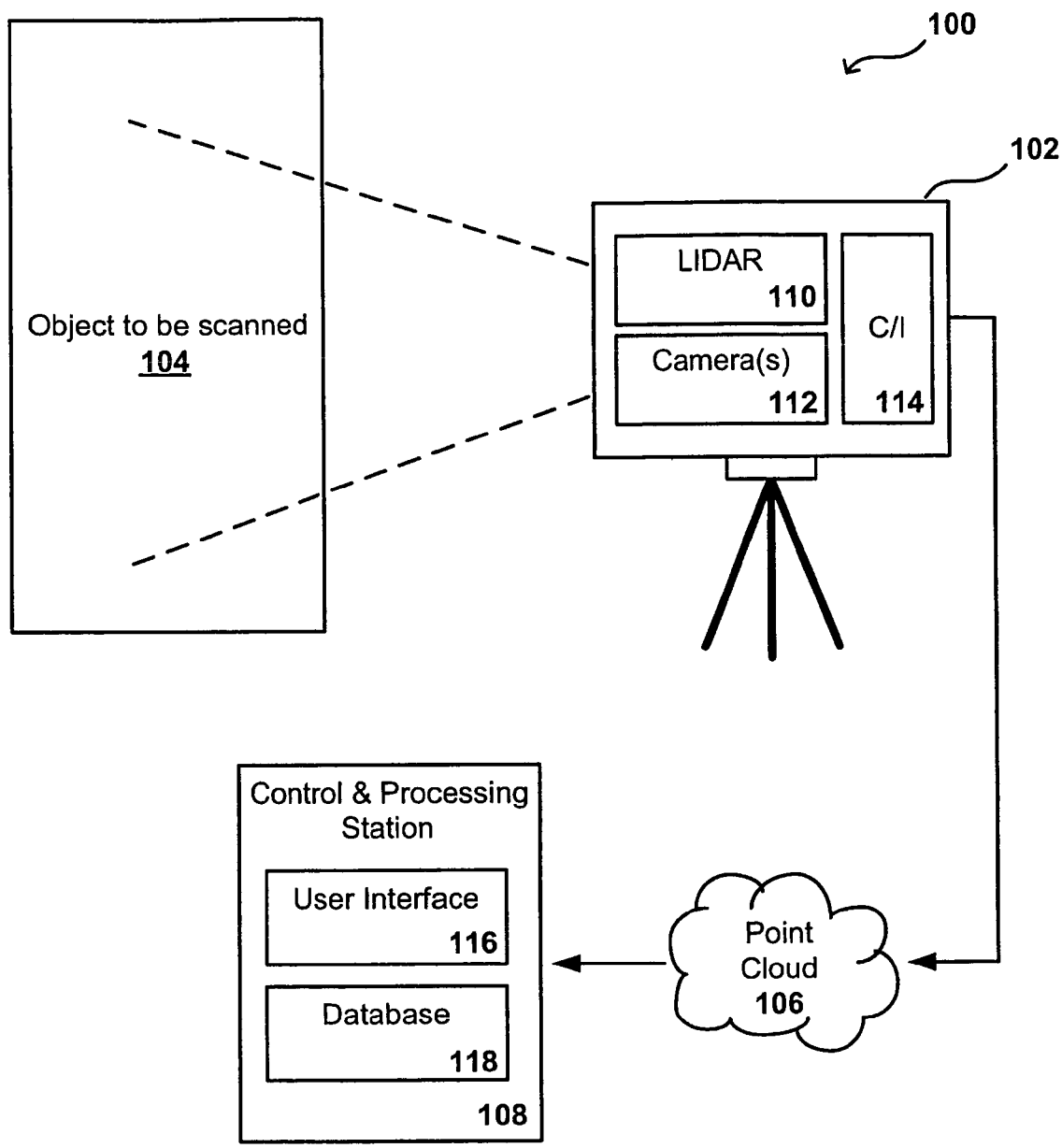
FIG. 1 is a diagram of a laser scanning survey system of the prior art.
Figure 2:
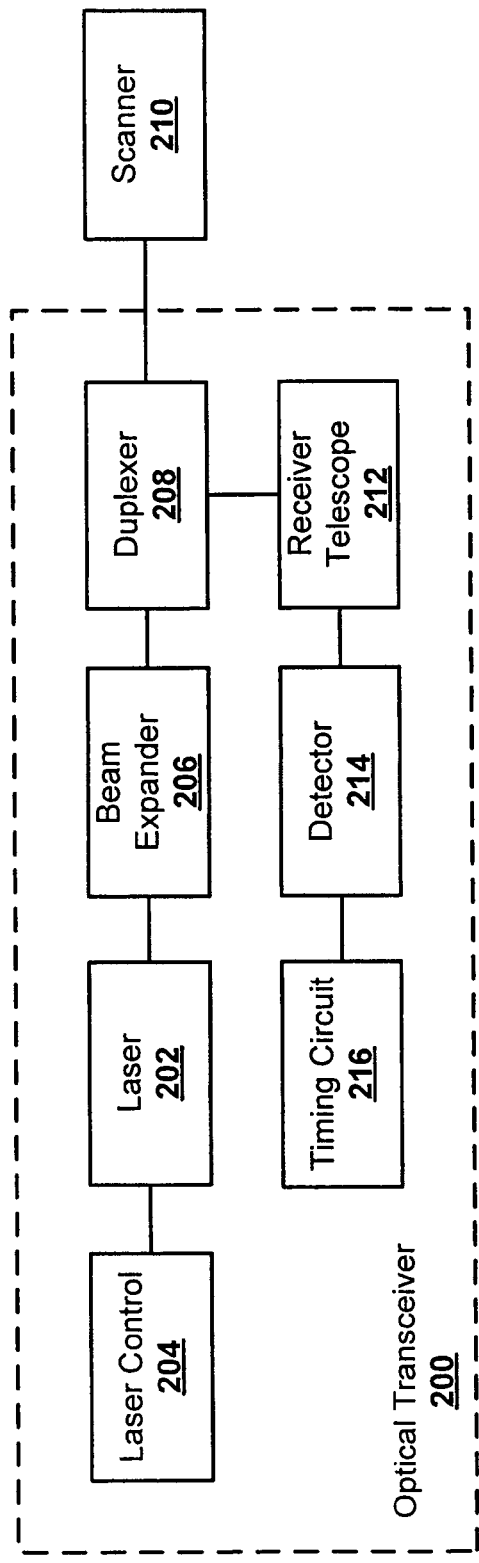
FIG. 2 is a diagram of an optical transceiver that can be used with the system of FIG. 1.
Figure 3:
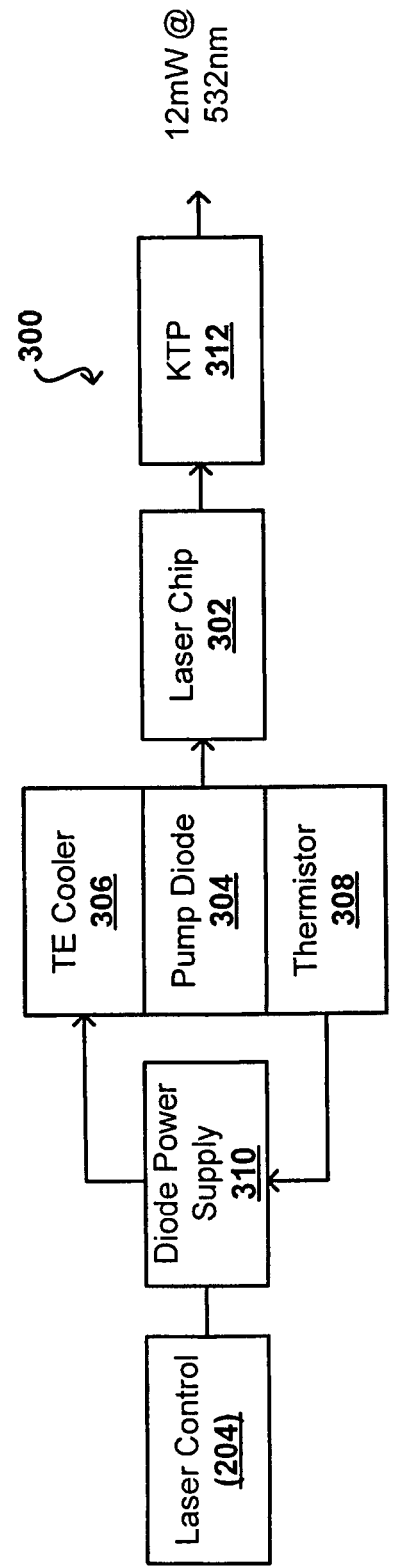
FIG. 3 is a diagram of a laser system that can be used with the system of FIG. 1.

In one example, the timing delay between the trigger signal and the pulse emission can be adjusted through control of the diode pump temperature of the laser system. The temperature can be controlled using any of a number of temperature regulation techniques known and/or used in the art, such as through the use of the thermoelectric cooler shown in and described with respect to FIG. 3. The temperature of the pump diode can be determined using a temperature sensing device such as the thermistor shown in FIG. 3. The pump temperature then can be provided to the laser control system. During the test procedure, the system may decide to adjust the pump temperature based solely on the outside environmental temperature. Data can be stored in the device such that a desired pump temperature starting point is known for a given outside temperature range. Alternatively, the pump temperature starting point can be determined using a parameter determination algorithm described elsewhere herein. The system also can determine during the testing procedure that the timing delay is outside an acceptable range, whereby the laser control system can automatically adjust the pump temperature in order to increase or decrease the delay as necessary.

The system also can be set up to monitor the delay during scanning operation, and adjust the temperature as needed during operation. For example, a scan might capture millions of data points over a period of several minutes. During this time, the temperature of the laser system can tend to rise and/or fluctuate. In addition to simply maintaining the pump temperature, the system can continually monitor the pump temperature in combination with the delay, such that variations can be made to the pump temperature via the thermoelectric cooler in order to optimize the performance of the laser during the scan process.

The delay also can be controlled through use of the laser current. In a pulsed laser system, for example, a current is applied from a diode power supply at a "pulsed" level when a laser pulse is desired, and at an "idle" level between pulses. The timing of the pulses, or the application of a pulsed or idle level of current, can be controlled by a control signal from the laser control system. As discussed, the actual emission of the pulse will be delayed relative to the control signal, and the delay can vary under various environmental and operating conditions. The current applied to the laser can affect the delay, as different amounts of time are necessary for signals of differing currents to pass through the laser circuitry. If the laser control system determines that the delay is outside an acceptable range, the system can automatically adjust at least one of the idle current and pulsed current in order to increase or decrease the delay as necessary. A search algorithm can be used to determine the appropriate starting idle and/or pulsed currents to be used for the appropriate environmental/operating conditions. The laser control system also can be set up to monitor the delay during operation, and adjust the currents as needed during scanning operation.

By controlling the currents applied to the laser and/or the operating temperature of the laser, the output of the laser can be regulated to within an acceptable range of continuity, and the laser can be maintained at an optimal state of operation.

In another method for adjusting these parameters, the LIDAR system again can be set up to fire a test sequence at scan startup, such as by firing a series of pulses over a given interval of time. At about the time of firing, the system can determine any appropriate environmental conditions, as discussed above. The system also can measure the actual delay between the issuing of a fire command and the actual emission. Once the test information is obtained, the information can be plugged into a search algorithm to predict the appropriate laser operating parameters for the current conditions. This approach may not provide operating parameters that are as precise as those determined through the method of FIG. 4, but can be obtained much more rapidly as only one sequence of test bursts need be fired.

Many metrics for performance can be applied to determine performance, such as the average delay. In one test arrangement, the average delay is determined for generating a laser pulse when operating the laser at 3000 Hz for approximately 4 seconds. A number of other laser performance parameters can be measured and controlled, such as the output wavelength, output power, and stability of these measured outputs over time. Methods for measuring and/or adjusting these parameters are known in the art and do not need to be discussed herein in detail. An optimization algorithm can be used to automatically select laser operating parameters to adjust and maintain any of these performance parameters. Nonlinear optimization techniques such as a simplex technique as known in the art can be used to shorten the duration of various parameter searches. Further, the range and starting points of the parameter search can be adjusted depending on external factors such as temperature and pressure.

Laser Safe Operation

As discussed above, surveying instruments utilizing a laser beam must meet stringent safety regulations. For instance, an exemplary laser scanning system is a Class 3R (eye safe) laser product in accordance with IEC 60825-1 Edition 1.2 (2001-08) Regulations. Further, ANSI acceptable exposure limits (AEL) set the maximum amount of energy that can fall upon a potential retina over about a quarter second interval for visible radiation. As discussed above, the power of the radiation pulses is limited to less than about 200 nJ. Restrictions used in previous scanning systems can cause problems with the accuracy of laser measurements as discussed above. These restrictions also function to limit the use of the device in terms of scanning speed and single point measurements.

One existing way to avoid these restrictions is to simply choose not to fire the laser when the firing would exceed safety regulations. For example, a scanner might require the location of the laser spot to move a minimum amount between pulses. This distance can be, for example, the minimum distance that the spot could move during the time between pulses without subjecting an eye to more than an acceptable number of pulses. The location of each laser spot on the scanned object can be monitored during scanning, using the detection of the reflected pulses as described above, such that the laser control system can determine whether it is safe to fire the laser at the next commanded position of the laser beam. The guide for safety here is a minimum point spacing as required by the laser safety regulations. If the next firing position is not within safety regulations, the firing of the laser is aborted until the beam has moved sufficiently to ensure laser safety. The laser will then fire for the next scan point that is at a safe distance. While this is an acceptable solution, the approach results in a lower number of scan points for a given scan time, and a spatially uneven sampling of the object due to aborted scan points at various locations throughout the scan.

In an approach in accordance with one embodiment of the present invention, the rate at which the laser is fired can be adjusted to ensure that the laser is run at an eye-safe level. The firing rate can be reduced to a point where the blink reflex of the human eye is fast enough to protect the eye from damage. In one embodiment, the maximum pulse rate is set to 24 Hz. This approach allows the laser to fire at regular intervals, with no aborted points. When the laser is operating at this speed, however, the beam can be difficult to find and use for targeting because the spot that is produced may not appear to be very bright under various conditions. This is a known problem among other range finding survey instruments, where the current solution is to use a small optic viewing element to help locate this beam.

Figure 5:
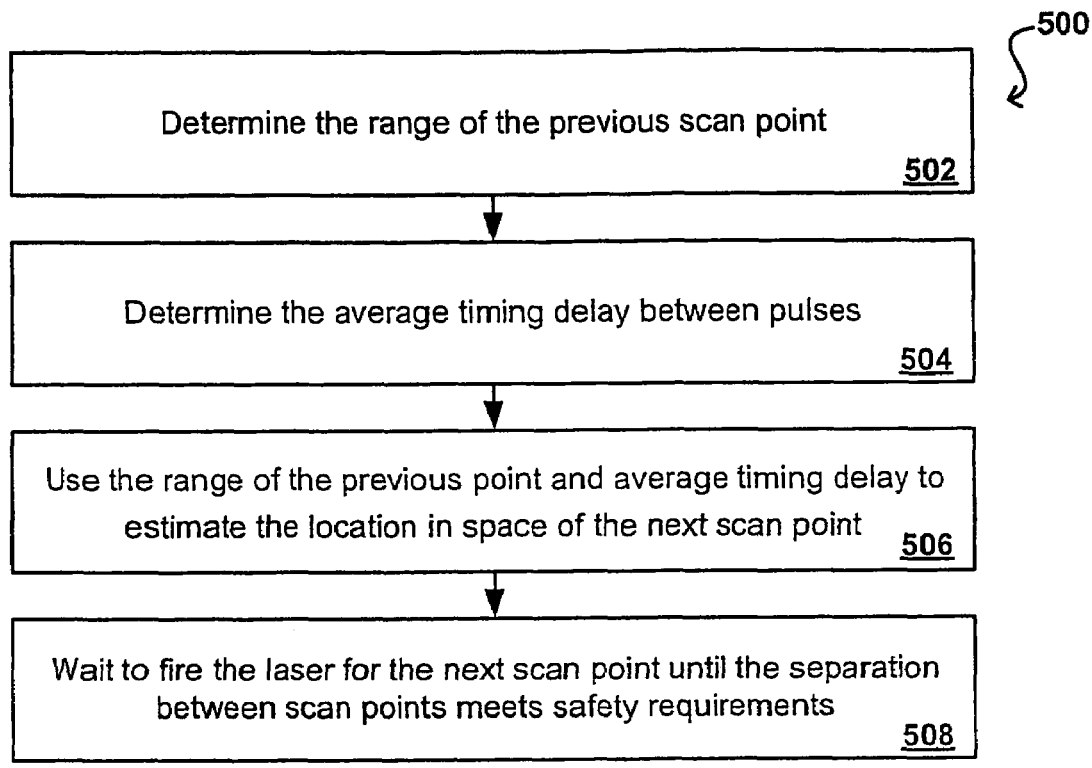
FIG. 5 is a flowchart showing steps of another process that can be used with the system of FIG. 1.

An approach in accordance with another embodiment of the present invention avoids the aborting of scan points and loss of intensity by precisely computing the necessary delay and adjusting point spacing to ensure the commanded spacing is obeyed, despite the range of the object being scanned. In an exemplary method 500 as shown in FIG. 5, the laser control system determines and retains the distance determination from a previous scan point 502. The control system can determine the timing delay between pulses (discussed above) 504, which can be combined with the position of each mirror or beam steering device, used to direct the laser pulse, to predict the location in space where the next scan point (laser spot) will occur 506, within a certain margin of error. A more complex system can retain position information relating to the last several points in order to extrapolate the position of the next scan point. The estimated separation between scan points can be used to determine when it is safe for the laser to fire 508, such as when the separation at least meets a minimum distance threshold. By waiting until the laser is safe, the laser control system can control the timing of laser firing to ensure proper spacing of the points. This approach does not result in the loss of data points due to aborted scan points, and avoids problems with previous systems that required the laser to be run at lower power. Although this approach uses the range and angular position of the beam to determine laser safety, other measured properties could be used as well, including a relative change in distance and/or intensity of the return light.

An approach in accordance with another embodiment uses pulse bursts to avoid problems with aborted scan points and lowered intensity. Using a burst of pulses for each scan point can provide laser spots that appear to be much brighter than a series of evenly spaced pulses running at a fixed frequency at the same location. The flashing nature of the bursts tricks the eye into thinking that the spot is brighter. The laser can fire bursts that are separated by enough time to allow the eye to blink, thereby also meeting safety regulations.

Figure 6:
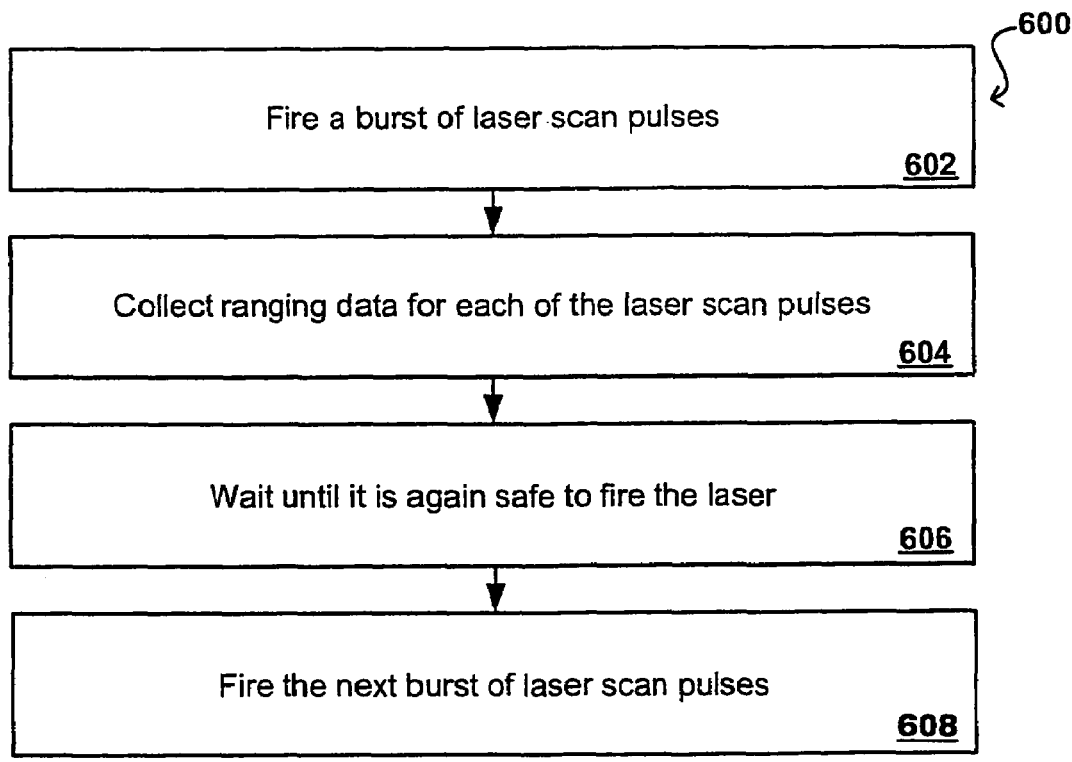
FIG. 6 is a flowchart showing steps of another process that can be used with the system of FIG. 1.

In one exemplary method 600 described with respect to FIG. 6, a laser fires bursts of six pulses each, with a maximum average speed of 24 Hz for the pulses 602. While the speed of the pulses is no greater than for other embodiments, the beam will have much greater visibility due to the repeated spot generation at each scan position. Ranging data can be collected for each of the pulses in a burst 604. The laser control system then can wait to fire the next burst until the system determines it is again safe to fire 606, such as by using one of the approaches discussed above. Once it is safe to fire, the laser system controller can fire the next burst of pulses 608. The number of pulses in a burst, as well as the time delay between bursts of laser energy, can depend upon factors such as the laser safety level, the laser power, and number of pulses. For various systems, the number of bursts can range between about 4 and about 20. The maximum number of pulses in a burst can be determined by the AEL for the particular laser. This approach can be simpler than other approaches discussed herein, as there is no requirement for a determination of the angular displacement of the beam.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of safely operating a laser scanner, comprising the steps of:
   determining range information for a first scan point;
   determining an orientation of a beam steering portion of the laser scanner;
   using the range information and orientation to predict a location of a subsequent scan point; and
   waiting to fire the laser scanner for the next scan point until the separation between the first scan point and the subsequent scan point reaches a minimum safety threshold.

2. A method according to claim 1, further comprising:
   selecting the minimum safety threshold using an acceptable exposure limit for the laser scanner.

3. A method according to claim 1, wherein:
   the range information is determined by measuring the time between an emission and a detection of a laser pulse from the scanner, reflected from an object being scanned.

4. A method of safely operating a laser scanner, comprising the steps of:
   determining a first position of a first scan point on an object being scanned;
   estimating a second position for a second scan point on the object; and
   delaying firing of the laser scanner for the second scan point until an estimated separation between the first scan point and the second scan point reaches a minimum safety threshold.

5. A method of safely operating a laser scanner, comprising the steps of:
   firing a first burst of pulses of visible light toward a first scan position on an object to be scanned, the first burst of pulses including a plurality of pulses having a first spacing of time between them;
   collecting range data for the first burst of pulses;
   determining a safe time when a firing of a subsequent burst of pulses will not exceed a safety threshold for the laser scanner, the safe time being different than the first spacing; and
   firing a second burst of pulses of visible light toward a second scan position on the object after reaching the safe time,
   whereby the burst of pulses enhances visibility of the visible light.

6. A method according to claim 5, wherein the first spacing is such that the laser is fired at a maximum average speed of 24 Hz.

7. A method according to claim 5, further comprising:
   determining a number of pulses to be included in each of the first and second bursts, the number of pulses being determined using an acceptable exposure limit for the laser scanner.

8. A method according to claim 5, wherein:
   each of the first and second bursts contains between about 4 and about 20 pulses.

9. A method according to claim 5, wherein:
   each of the first and second bursts contains about 6 pulses.

10. A method of safely operating a laser scanner, comprising:
    determining range information for a first scan point;
    determining an orientation of a beam steering portion of the laser scanner;
    determining additional information including at least one of a relative change in distance between scan points and intensity of light measured for the first scan point; and
    using the range information, orientation and additional information to predict a location of a subsequent scan point; and
    waiting to fire the laser scanner for the subsequent scan point until separation between the first scan point and the subsequent scan point reaches a minimum safety margin.

11. A method for safely operating a laser scanner according to claim 1, further comprising repeating the step of determining range information and constructing a point cloud from the range information and orientation, whereby the point cloud has a spatially even sampling of points despite waiting to fire the laser until reaching a minimum safety threshold.

12. A method for safely operating a laser scanner according to claim 5, further comprising repeating the step of collecting range data and constructing a point cloud from the range data, whereby the point cloud has a spatially even sampling of points despite not exceeding the safety threshold for the laser scanner.

13. A method for safely operating a laser scanner according to claim 5, wherein the step of firing a burst of pulses includes firing a pulse of sufficient power to collect range data from objects up to 100 meters from the laser scanner, and wherein collecting range data includes collecting range data returned from the object that us up to about 100 meters from the laser scanner, whereby firing a second burst of pulses after reaching the safe time makes the laser scanner eye-safe even if an eye is closer than 100 meters from the laser scanner.

* * * * *

UNITED STATES PATENT AND TRADEMARK OFFICE
CERTIFICATE OF CORRECTION

PATENT NO.       : 7,323,670 B2                                      Page 1 of 1
APPLICATION NO.  : 11/081354
DATED            : January 29, 2008
INVENTOR(S)      : Walsh et al.

It is certified that error appears in the above-identified patent and that said Letters Patent is hereby corrected as shown below:

<u>Title Page, item [75]</u>
Column 1, Inventors, remove the inventor:
"Ralph Storz, Colts Neck, NJ (US)"
Column 1, Inventors, insert the inventor:
-- Grant W. McKinney, Berkeley, CA (US) --

Signed and Sealed this

Thirteenth Day of May, 2008

JON W. DUDAS
*Director of the United States Patent and Trademark Office*